March 11, 1924.

N. B. LAING 1,486,386

ELECTRIC CONTROLLER

Filed Jan. 17, 1923     4 Sheets-Sheet 1

Inventor

Norman B. Laing,

By

Attorneys

March 11, 1924.  
N. B. LAING  
ELECTRIC CONTROLLER  
Filed Jan. 17, 1923  
1,486,386  
4 Sheets-Sheet 2

Inventor  
Norman B. Laing,  
By  
Attorneys

March 11, 1924.

N. B. LAING

ELECTRIC CONTROLLER

Filed Jan. 17, 1923

Inventor

Norman B. Laing,

By

Attorneys

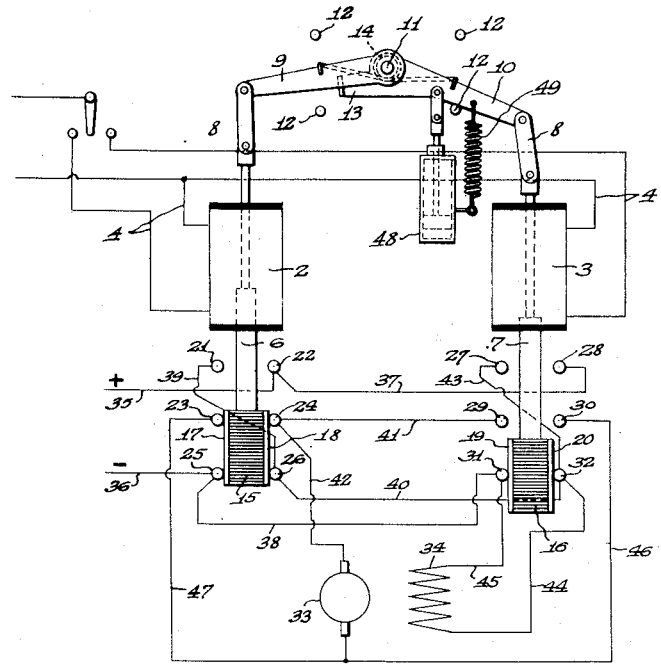

Patented Mar. 11, 1924.

1,486,386

UNITED STATES PATENT OFFICE.

NORMAN B. LAING, OF DETROIT, MICHIGAN.

ELECTRIC CONTROLLER.

Application filed January 17, 1923. Serial No. 613,135.

*To all whom it may concern:*

Be it known that I, NORMAN B. LAING, a subject of the King of Great Britain, residing at Detroit, in the county of Wayne and State of Michigan, have invented certain new and useful Improvements in Electric Controllers, of which the following is a specification, reference being had therein to the accompanying drawings.

This invention relates to an electrical controller adapted to be associated with a direct current motor or any work performing unit in which a dynamic force may be utilized as a brake or retarding instrumentality to control the action of the motor and consequently any work performed thereby.

My invention aims to provide an electric controller of few parts which will have electrical connections necessary for a reversing operation, with dynamic braking in both directions of a series, compound wound or heavy duty reversible direct current motor. The controller is semi-automatic in its action by utilizing an external force to effect the connections which control the direction of operation of the motor, and when the external force is removed the controller automatically isolates the motor from its source of power and interconnects the motor so that parts thereof form an electric or dynamic brake. The external force may be manual, direct or remote, and pneumatic or mechanical means may be employed in connection with the controller. The controller may be in the form of a reciprocatory, rotary or double throw switch in circuit with a source of power and adapted to control the source of power to the motor or work performing unit, and when the switch is of the reciprocatory type solenoids may be conveniently used to actuate the switch.

My controller has a wide range of application but has been primarily designed to be used in connection with a hoist or such apparatus employing mechanical brakes. If such brakes fail the electric or dynamic brake set in action by my controller may be relied upon for controlling movements after the prime mover has been isolated.

My invention will be further described by aid of the accompanying drawings, in which—

Fig. 6 is a similar view illustrating how a retarding device may be associated with the controller to prevent a sudden application of the dynamic force, and Figs. 7 and 8 are diagrammatic views of controllers illustrating other forms or modifications of the same.

Figure 1:
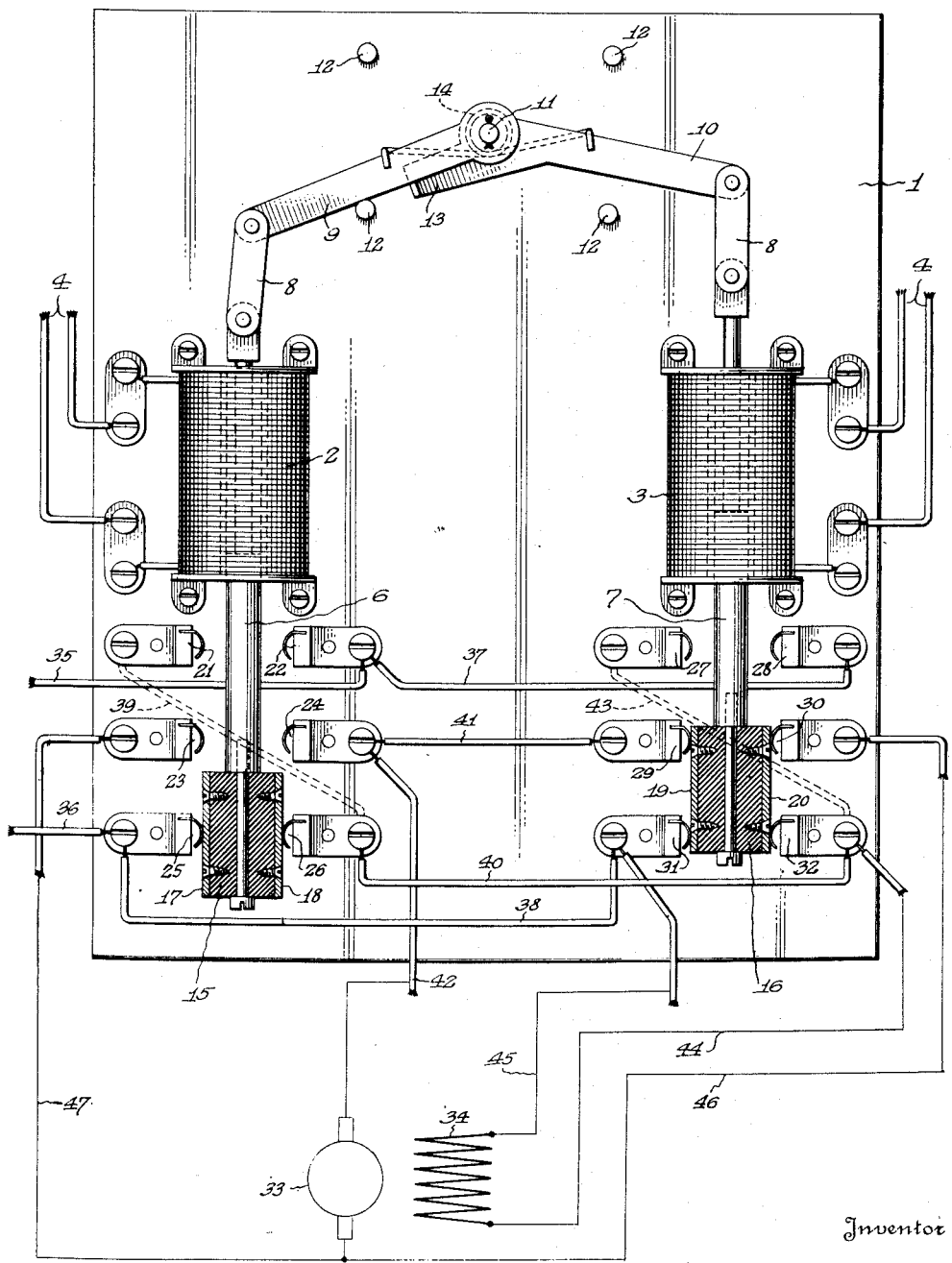
Figure 1 is a front elevation of one form of controller answering the purposes of this invention, showing the same in connection with a series or compound, wound direct current motor.

For the convenience of describing my invention, I will consider a base or board 1 as being in a vertical position and suitably mounted on the base 1 are solenoids 2 and 3 having leading out wires 4 provided with a switch 5 and said leading out wires are adapted to be connected with a suitable source of electrical energy by which either of the solenoids 2 or 3 may be energized, depending on the position of the switch 5. It is in this connection that the solenoids represent switch actuating instrumentalities that may be controlled manually or otherwise, direct or from a remote point, and as shown, the switch 5 constitutes means for controlling the use of an external actuating force.

Slidable in the solenoids 2 and 3 are core pieces 6 and 7 respectively, having the upper ends thereof pivotally connected by links 8 to the pivoted interlocking members 9 and 10 of an interlocking device mounted on the base 1 and including a pivot or fulcrum pin 11 for the members 9 and 10. These members are movable relative to stops 12 on the base 1 and the member 10 has a stop extension 13 engaging under the member 9 to cause the members 9 and 10 to move, at times, in synchronism. Suitably supported relative to the members 9 and 10, probably by the pin 11, is a resilient member 14 in the form of a spring having its ends engaging the upper edges of the members 9 and 10 to produce a constant pressure on said members. The arrangement of this spring is such that the members 9 and 10 may alternately serve as holding means for one end of the spring while the opposite end of the spring is actuated to further stress the same and there may be times when the spring serves as a force for automatically shifting both members. The real purpose of this interlocking device will hereinafter appear when considering the operation of the controller.

On the lower ends of the core pieces 6 and 7 are fixed insulators 15 and 16, the insulator 15 being provided with contact connecting members or connectors 17 and 18, and the insulator 16 with contact connecting members or connectors 19 and 20.

Mounted on the base 1, adjacent the core 6, are upper contact pieces 21 and 22, intermediate contact pieces 23 and 24, and lower contact pieces 25 and 26, all of said contact pieces being positioned so that the contact pieces 21, 23 and 25 may be wiped or engaged by the connector 17, and the contact pieces 22, 24 and 26 wiped or engaged by the connector 18.

Contiguous to the core 7 are upper contact pieces 27 and 28, intermediate contact pieces 29 and 30, and lower contact pieces 31 and 32. The contact pieces 27, 29 and 31 are adapted to be wiped or engaged by the connector 19 and the connector 20 is adapted to wipe or engage the contact pieces 28, 30 and 32.

The controller is adapted to be associated with a work performing device and as illustrating a conventional form of such device I show a direct current motor 33 having a field 34 and the electrical connections between the motor, the contact pieces 21 to 32 inclusive, and a source of electrical power are as follows:—

35 and 36 are leading in wires from an external source of electrical energy adapted for operating the motor 33 and the leading in wire 35 is connected to the contact piece 22 and said contact piece connected by a wire 37 to the contact piece 28, while the leading in wire 36 is connected to the contact piece 25 and said contact piece by a wire 38 to the contact piece 31.

39 is a wire connecting the contact piece 21 to the contact piece 26 and this contact piece is connected by a wire 40 to the contact piece 32.

41 is a wire connecting the contact piece 24 to the contact piece 29, and the contact piece 24 is also connected by a wire 42 to one side of the motor 33.

43 is a wire connecting the contact piece 27 to the contact piece 32, which in turn is connected by a wire 44 to the field 34, said field being connected by another wire 45 to the contact piece 31.

46 is a wire connecting one side of the motor 33 to the contact piece 30 and the same side of said motor is connected by a wire 47 to the contact piece 23.

Before describing the modifications of my invention I will briefly describe the operation of the controller as brought out by Figures 2 to 5 inclusive. In these figures the heavy line electrical connections indicate active circuits and in Fig. 2 the switch 5 has been thrown to complete a circuit which energizes the solenoid 3 causing the core 7 to be elevated and place the connector 19 in engagement with the contact pieces 27 and 29, and the connector 20 in engagement with the contact pieces 28 and 30. Elevation of the core 7 has rocked the member 10, stressing the spring 14 and causing said spring to place the member 9 in engagement with one of the stops 12 with the core 6 of the de-energized solenoid 2 lowered between the lower contact pieces 25 and 26. The flow of the current has been indicated by arrows and the motor 33 is driven in a clockwise direction to perform the duty assigned to it.

Figure 3:
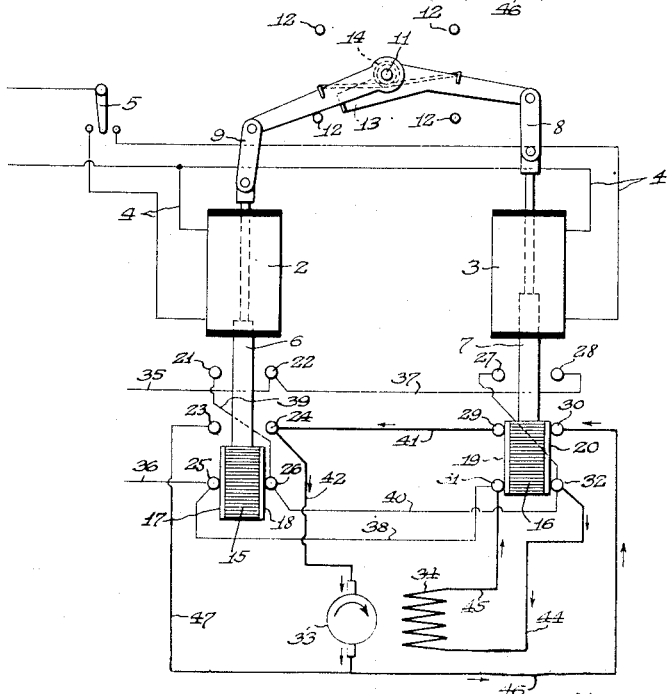
Fig. 3 is a similar view showing the controller actuated to effect a dynamic brake in connection with the motor.

Assuming that there is to be a cessation in the operation of the motor 33 and an application of the dynamic brake to prevent overrunning of the motor and danger or trouble incident thereto, opening of the switch 5, as shown in Fig. 3 de-energizes the solenoid 3 and since the spring 14 has been previously stressed said spring will equalize the members 9 and 10 to the extent of placing said members in normal condition, as shown in Fig. 1, that is, with the member 9 still engaging the lower stop 12 and the stop extension 13 of the member 10 in engagement with the member 9. When the members 9 and 10 of the interlocking device are in this condition, the connector 19 connects the contact pieces 29 and 31 and the connector 20 connects the contact pieces 30 and 32, thus disconnecting the motor from the source of power and interconnecting the armature 33 and field 34 to form a short circuit. This reverses the flow of current through the armature 33 and builds up the magnetism of the field 34 so that the armature and field cooperate in retarding and eventually stopping the overrunning action of the armature. The controller therefore establishes a magnetic braking action in the motor which will quickly come to rest.

Figure 2:
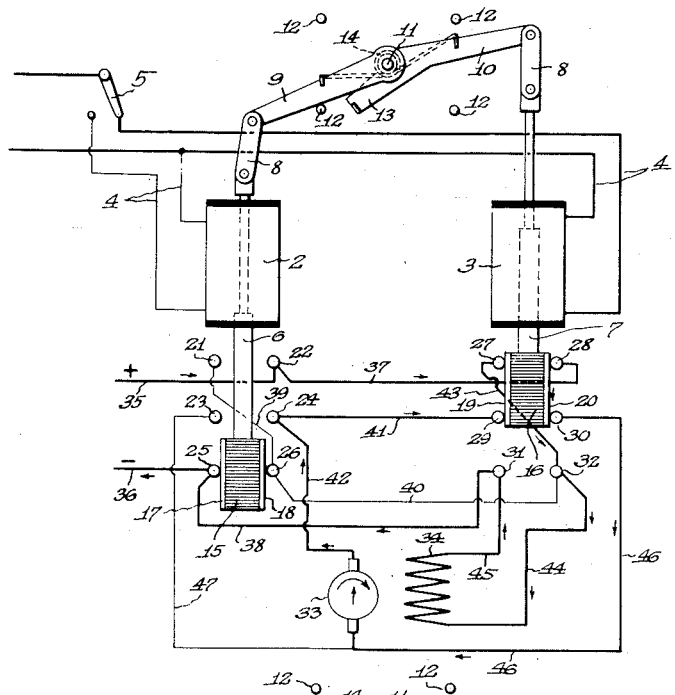
Fig. 2 is a diagrammatic view of the controller illustrating the circuits controlled by the controller for operating the motor in one direction.
Figure 4:
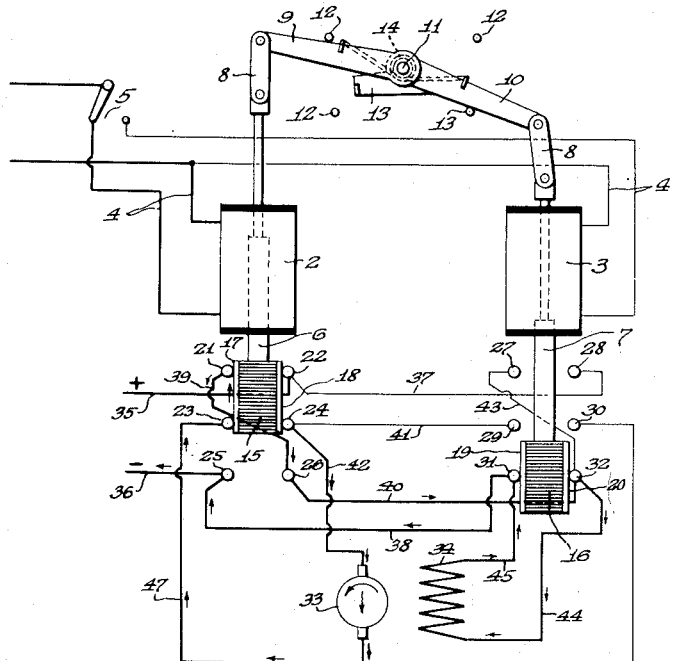
Fig. 4 is a similar view showing the controller establishing circuits for operating the motor in a reverse direction from that shown in Fig. 2.
Figure 5:
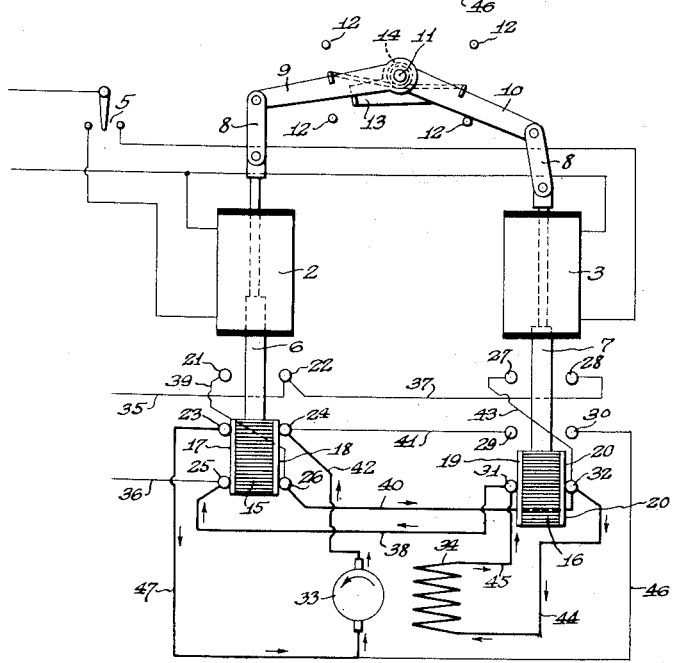
Fig. 5 is a similar view showing the controller actuated to effect a dynamic brake for reverse operation of the motor outlined in Fig. 4.

Since the controller may be used in connection with a reversible direct current motor operative conditions have been illustrated in Figs. 4 and 5 wherein the solenoid 2 is energized to operate the controller and establish circuits for operating the motor in a reverse or counterclockwise direction from that shown in Fig. 2, and using the dynamic force as a brake for such reversal of the motor has been brought out in Fig. 5.

As previously stated the motor 33 may be used for various purposes, one of which may be in connection with a hoist and in this and other uses it may be necessary or desirable to retard or momentarily postpone the application of the dynamic brake. For this purpose a convential form of dash pot or retarding device 48 (Fig. 6) may be employed with the piston or plunger connected to the member 10 and said member connected to a coiled retractile spring 49 of sufficient retractile force to establish the inoperative position of the controller members shown in Fig. 6. This is particularly advantageous where a mechanical brake is employed for controlling the operation of the hoist and for some reason or other the mechanical brake should not be operated in time or fail to operate in which case the dynamic brake is automatically effective. The action of the dash pot 48 in retarding the downward motion of the core 7 maintains contact between connector 19 and contact pieces 29 and 31, and between connector 20 and contact pieces 30 and 32 for a sufficient period of time to stop the upward movement of an unloaded hoist.

As set forth in the beginning the principle of the controller may be embodied in a rotary or reciprocatory switch and as an instance of two forms of reciprocatory switches, reference is now had to Figs. 7 and 8. Here the contact pieces 21 to 32 inclusive may be considered as laid out so that the connectors 17 to 20 inclusive may be operated in a linear direction by an external force, mechanical or otherwise, indicated by arrows 50 and 51. Considering Fig. 7 the insulators of the connectors are connected by a coiled retractile spring 52 which affords a synchronous movement of the connectors when occasion requires, yet permits of one set of connectors moving independent of the other set. To limit the movement of these connectors there are end stops 53, an intermediate stop 54, and a stop member 55, carried by one of the insulators, which defines the spaced relation between the insulators and affords a cooperation of the shiftable elements of the controller.

Considering Fig. 7 and the application of an external force in the direction of the arrow 51, a circuit is established for operating the motor in a clockwise direction with the insulator 15 abutting the intermediate stop 54 and the spring 52 under additional tension. When such force is released the spring 52 restores the insulator 16 to the position shown in Fig. 7 causing the dynamic brake to be applied. To reverse the operation of the motor the external force is applied in the direction of the arrow 50 and the insulator 15 is shifted to establish a circuit with the current flowing in an opposite direction. The insulator 16 abuts the intermediate stop 54 with the spring 52 under additional tension. When this force is released the rectractile force of the spring 52 shifts the insulator 15 so that its connectors may establish circuits for the dynamic brake, and in this instance it will be noted that the stop member 55 is brought into action to limit the movement of the insulators 15 and 16 and prevent the insulator 15 from assuming the position shown in Fig. 7, without first having caused the application of the dynamic brake.

In order that this type of reciprocatory switch can be used in connection with a hoist, the intermediate stop 54 is repositioned, as shown in Fig. 8 and connected to the insulator 16 by a coiled retractile spring 56. This spring provides one position of "rest" instead of two "rest" positions, as in Fig. 7, and the one rest position effects dynamic braking against downward travel of a hook or other part of a hoist, so that failure of mechanical load brakes puts the dynamic brake into action automatically, which permits the load to descend slowly and without danger.

As described above the controller contact and connectors may switch a motor directly, but it is obvious that automatic accelerating devices may be incorporated in external circuits for operating large machines. Furthermore, the controller is suitable for use with shunt type contactors by means of which it may handle any heavy duty reversible direct current motor.

My invention, in its broadest aspect, involves in combination with an electric motor in which the armature circuit may be reversed to establish a magnetic action between the armature and field, of a semi-automatic controller wherein two movable elements serve as circuit making and breaking devices which are automatically interlocked under certain conditions, and since the principle involved may be embodied in various kinds of electrical apparatus, I do not care to confine my invention to any arrangement defined by such terms as "forward", "reverse", "raised", "lowered", "reciprocated", etc., as the same are simply used for the convenience of describing my invention.

What I claim is:—

1. In a circuit controller, a direct current motor, a forward operating circuit for said motor, a reverse operating circuit for said motor, a circuit for effecting a dynamic braking action for each forward and reverse operation of said motor, movable switching elements adapted to be actuated by an external force to make and break such circuits, and means articulating said switching elements to cause either a coaction or independent action of said switching element under various circuit conditions.

2. In a circuit controller, a direct current motor, contact pieces adapted for circuits including said motor, movable switching elements adapted to be actuated to make and break power circuits for said motor which circuits include said contact pieces, and means articulating said switching elements which permits of one element being shifted and the other remaining stationary, such relative positions establishing an operative power circuit for said motor that may be broken and another circuit established to effect a dynamic braking action of said motor.

3. A circuit controller as called for in claim 2, and means adapted for shifting either of said switching elements with means connected to one of said switching elements to retard the shifting of such switching element.

4. The combination of a direct current motor having a field, a source of electrical energy for said motor, and a controller in circuit with said motor, its field, and said source of electrical energy, said controller having a constructive arrangement of stationary contacts and movable connectors by which circuits may be established for forward and reverse operations of the motor, and also circuits by which the motor may be converted into a generator to establish a magnetic action between the armature of the motor and the field to produce a dynamic braking action for either forward or reverse operation of the motor, the controller contacts being arranged in sets and grouped relative to the movable connectors of the controller with means articulating the movable connectors so that said connectors may be shifted in synchronism or independent of each other.

5. The combination of a direct current motor having a field, a source of electrical energy for said motor, a controller in circuit with said motor, its field and said source of electrical energy; said controller having a constructive arrangement of stationary contacts and movable connectors by which circuits may be established for forward and reverse operations of the motor, and also circuits by which the motor may be converted into a generator to establish a magnetic action between the armature of the motor and the field to produce a dynamic braking action for either forward or reverse operation of the motor, and means adapted for moving said controller connectors in synchronism or independent of each other.

6. The combination of a direct current motor having a field, a source of electrical energy for said motor, a controller in circuit with said motor, its field and said source of electrical energy; said controller having a constructive arrangement of stationary contacts and movable connectors by which circuits may be established for forward and reverse operations of the motor, and also circuits by which the motor may be converted into a generator to establish a magnetic action between the armature of the motor and the field to produce a dynamic braking action for either forward or reverse operation of the motor, and means articulating the movable connectors of said controller so that movement of one connector locks the other connector against accidental movement.

7. An electric controller comprising a support, stationary electrical contacts insulated from each other and adapted to be connected by wires to an external circuit, movable contact connecting elements for effecting interconnections of the said contacts, means associated with said elements tending to maintain constant relative positions thereof but permitting each element at times to be influenced by an external force compelling change of location relative to each other, and stops to limit the travel of the moving elements.

8. An electric controller as called for in claim 7, and interconnecting means between the moving elements tending to maintain constant relative position of the moving elements one to the other, and also to maintain a constant position of both moving elements relative to the support.

9. A multi-duty switch for controlling the operation of a motor, said switch comprising sets of six contact pieces each, a movable connector for each set of contact pieces, and means articulating said connectors and under the influence of an external force for effecting various positions of the connectors, one of the switch conditions utilizing a connector for four contact pieces of one set to effect motor operation in one direction; another switch condition utilizing another four contact position of said connector to effect isolation of the power and a braking action of the motor against the inertia of the load, and other switch conditions which permit of motor operation in another direction and a braking action of the motor in connection therewith.

10. In a multi-duty switch, a direct current motor, contact pieces adapted for circuits with said motor, and connectors arranged for a plurality of electrical motor circuits by said contact pieces, two of said circuits being for forward and reverse actions of said motor, and two of said circuits being for braking actions in connection with said forward and reverse motor actions, means for actuating said connectors, and means articulating said connectors for locking one connector relative to the other.

In testimony whereof I affix my signature in presence of two witnesses.

NORMAN B. LAING.

Witnesses:
 KARL H. BUTLER,
 ANNA M. DORR.